(12) United States Patent
Schramm et al.

(10) Patent No.: US 7,192,079 B2
(45) Date of Patent: Mar. 20, 2007

(54) PEDESTRIAN PROTECTION APPARATUS FOR MOTOR VEHICLES

(75) Inventors: Michael Schramm, Perry, UT (US); Brent Parks, Englewood, CO (US)

(73) Assignee: Autoliv ASP, Inc., Ogden, UT (US)

( * ) Notice: Subject to any disclaimer, the term of this patent is extended or adjusted under 35 U.S.C. 154(b) by 94 days.

(21) Appl. No.: 10/811,417

(22) Filed: Mar. 26, 2004

(65) Prior Publication Data

US 2005/0212327 A1 Sep. 29, 2005

(51) Int. Cl.
*B60R 19/34* (2006.01)
*B60R 19/40* (2006.01)
*B60R 21/34* (2006.01)

(52) U.S. Cl. ............... 296/187.04; 296/187.09; 293/24; 293/118; 293/119; 293/132; 293/133

(58) Field of Classification Search ........... 296/187.04, 296/187.09, 187.1, 193.1; 293/115, 118, 293/119, 132, 133, 146, 9, 10, 24; 280/766.1
See application file for complete search history.

(56) References Cited

U.S. PATENT DOCUMENTS

| | | | |
|---|---|---|---|
| 3,792,889 A * | 2/1974 | Fuener et al. ............... 293/115 |
| 4,249,632 A | 2/1981 | Lucchini et al. |
| 4,518,183 A | 5/1985 | Lee |
| 4,932,697 A | 6/1990 | Hun |
| 4,944,540 A * | 7/1990 | Mansoor et al. ............ 293/115 |
| 4,961,605 A | 10/1990 | Cawthron et al. |
| 5,033,569 A | 7/1991 | Hayes |
| 5,042,858 A | 8/1991 | Schubert et al. |
| 5,042,859 A | 8/1991 | Zhang et al. |
| 5,096,242 A | 3/1992 | Chin-Hun |
| 5,106,137 A | 4/1992 | Curtis |
| 5,285,877 A | 2/1994 | Bonenberger et al. |
| 5,370,429 A | 12/1994 | Reuber et al. |
| 5,725,265 A | 3/1998 | Baber |
| 5,785,368 A | 7/1998 | Hartmann et al. |
| 5,810,427 A * | 9/1998 | Hartmann et al. ..... 296/187.03 |
| 5,967,573 A | 10/1999 | Wang |
| 6,174,008 B1 | 1/2001 | Kramer et al. |
| 6,217,108 B1 * | 4/2001 | Sasaki ................... 296/187.09 |
| 6,224,120 B1 * | 5/2001 | Eipper et al. ............... 293/118 |
| 6,237,992 B1 | 5/2001 | Howard |
| 6,257,657 B1 * | 7/2001 | Sasaki ................... 296/187.09 |
| 6,312,027 B1 | 11/2001 | Yang |
| 6,334,639 B1 | 1/2002 | Vives et al. |
| 6,343,821 B2 | 2/2002 | Breed |

(Continued)

FOREIGN PATENT DOCUMENTS

DE 102 59 428 A1 1/2004

(Continued)

*Primary Examiner*—D. Glenn Dayoan
*Assistant Examiner*—Greg Blankenship
(74) *Attorney, Agent, or Firm*—Sally J Brown

(57) ABSTRACT

A pedestrian protection apparatus particularly adapted for motor vehicle front end structures for mitigating injuries of pedestrians struck by the vehicle. The apparatus incorporates a front grill which is moveable between extended and retracted positions. While it is in its extended position, the grill is designed to absorb energy from a pedestrian impact to reduce pedestrian injuries. The position of the grill is controlled by an actuator which responds to control inputs such as vehicle speed.

26 Claims, 2 Drawing Sheets

U.S. PATENT DOCUMENTS

| | | |
|---|---|---|
| 6,394,512 B1 | 5/2002 | Schuster et al. |
| 6,439,330 B1 | 8/2002 | Paye |
| 6,447,049 B1 * | 9/2002 | Tohda et al. ............. 296/180.1 |
| 6,513,617 B2 | 2/2003 | Sasaki et al. |
| 6,516,278 B1 | 2/2003 | Ishizaki et al. |
| 6,571,901 B2 | 6/2003 | Lee |
| 6,588,526 B1 | 7/2003 | Polz et al. |
| 6,755,459 B2 * | 6/2004 | Thelen et al. .......... 296/187.04 |

FOREIGN PATENT DOCUMENTS

WO    WO 9620852 A1 *   7/1996

* cited by examiner

PEDESTRIAN PROTECTION APPARATUS FOR MOTOR VEHICLES

FIELD OF THE INVENTION

This invention relates to an apparatus for reducing pedestrian impact injuries caused by motor vehicles striking a pedestrian.

BACKGROUND OF THE INVENTION

Substantial advances have been made in recent years in the improvement of impact protection for motor vehicle occupants. Various strategies incorporating active and passive restraint systems have been implemented in motor vehicles. Sophisticated energy absorbing structures are designed into motor vehicles with an eye toward reducing occupant injuries.

While much progress has occurred in improving the safety of motor vehicle occupants in impact conditions, one segment of victims of motor vehicle impacts has been largely unaddressed; namely, pedestrians. Motor vehicle impacts with pedestrians remain a serious concern, taking the lives of many each year throughout the world and causing severe injuries.

Certain strategies are known to reduce the severity of pedestrian impacts. For example, it is known in the art to provide a motor vehicle with a front hood that raises a predetermined distance to provide for energy absorption in anticipation of a vehicle impact with a pedestrian. However, in order to take advantage of such hood lifting technologies, the vehicle must be designed such that the hood must not rise above a predetermined height. Otherwise, the hood lifting approach does not benefit typical pedestrians. Moreover, shorter pedestrians, including children, receive little benefit from hood lifting systems which are designed to reduce the severity of impact of the upper body of the pedestrian as a pedestrian's body is rotated by the initial impact with the lower torso.

Another technology for addressing pedestrian impacts has further been proposed which incorporates an inflatable energy absorbing structure deployed from the front end of the vehicle based on an anticipated impact. This approach has a substantial disadvantage that it must be deployed in an irreversible process in response to a detected impending impact. This requirement imposes significant design and cost penalties.

It is also known in the art to provide an extendable-type bumper arrangement for vehicles which, in anticipation of an impending vehicle crash, or in response to a predetermined speed threshold, will extend a predetermined distance from an unextended position. However, it is noted that such extendible-type bumper arrangements are designed to protect either the vehicle occupants or the vehicle. It is noted that in order to attenuate the energy of a first vehicle striking a second vehicle or the like, the energy absorption requirements are substantially different than would be optimal to attenuate the energy of a vehicle impacting a pedestrian with an aim toward reducing injury to the pedestrian. In fact, it should be recognized that most of the extendible bumper-type approaches for vehicle impact protection may pose a risk of greater harm to a pedestrian than a conventional bumper.

It is the lack of protection for pedestrians and, in particular, shorter pedestrians in combination with high hoods and the need for pre-crash human discrimination sensing and non-pedestrian friendly extended bumpers that are addressed by the present invention. This invention provides an improved pedestrian protection apparatus. The apparatus has particular use in mitigating harm otherwise caused to pedestrians when struck by an automotive vehicle. The invention incorporates a grill covering of the front end structure of a vehicle which is actuated to extend from the vehicle exterior based on commands from an electronic control unit.

Various strategies for deployment of the system of this invention may be implemented. For example, merely by sensing the speed of the vehicle, the grill could be automatically extended without intervention by a vehicle occupant whenever the vehicle is moving at city traffic speeds which would be typical in instances of pedestrian impact. The actuators for the grill may be designed to have energy absorbing characteristics, thus providing an energy absorbing "soft" grill structure which strikes the pedestrian. The extended position of the grill allows substantial energy absorption to occur, reducing pedestrian injuries. The extended grill may also secondarily act as a sensor for vehicle impacts. In the extended position, an impact load acting on the grill can be used to deploy additional pedestrian impact mitigation systems, such as hood lifting technology or inflatable energy absorbing structures.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE INVENTION

Figure 1:
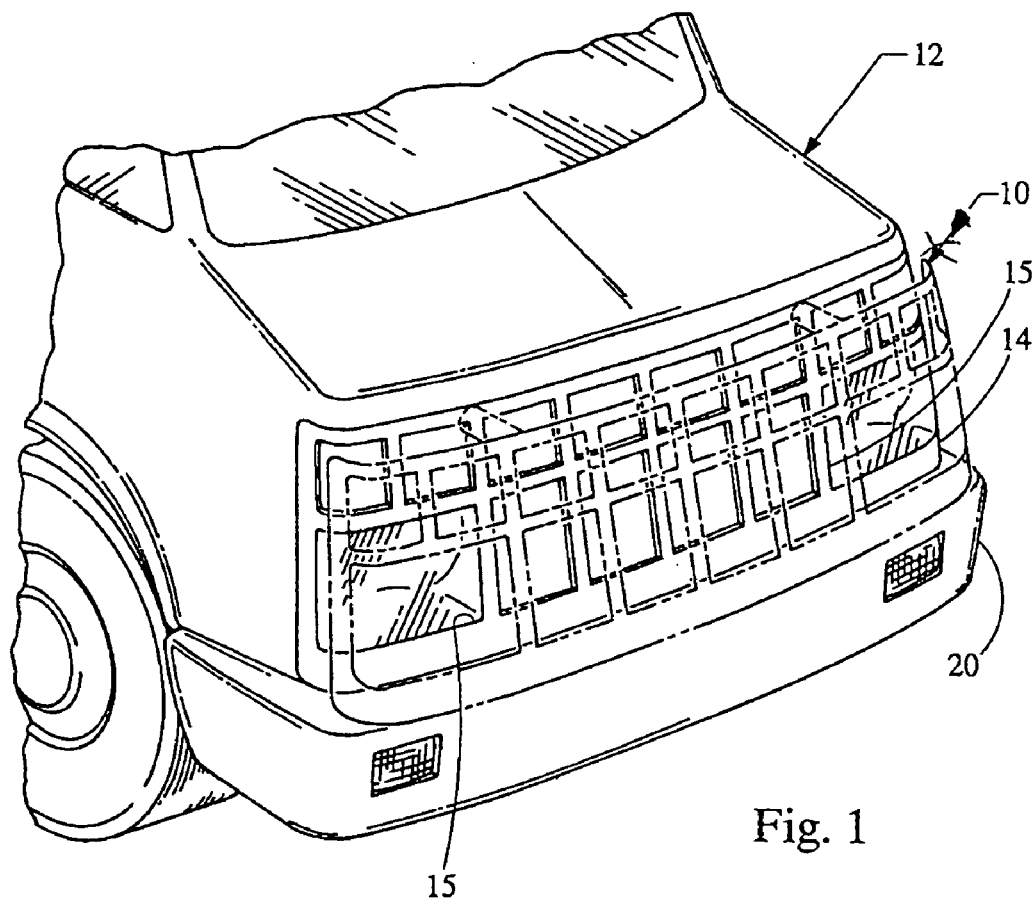
FIG. 1 is a diagrammatic view of the front end structure of a motor vehicle incorporating an extendible grill in accordance with this invention showing the grill in a retracted position shown in full lines, and an extended position shown in phantom lines.

With reference to FIG. 1, pedestrian protection apparatus 10 is shown integrated into a motor vehicle front end structure 12. Pedestrian protection apparatus 10 incorporates an extendable grill 14 which is an enlarged frame-like structure having appropriate openings for vehicle head lights shown as opening 15, and other open areas to satisfy air intake, cooling, and styling requirements. Preferably, the outer perimeter of grill 14 substantially encompasses the forward surface of motor vehicle front end structure 12 (i.e. the frontal, generally "flat" surface of the vehicle subject to striking a pedestrian). Grill 14 could be formed from various materials including metals and polymers with an aim of reducing impact injury through deformation and energy absorption.

Grill 14 is designed such that it is capable of stroking between a retracted position shown in full lines in FIG. 1 and a forwardly extended position extending from the vehicle as shown in phantom lines in FIG. 1.

Figure 2:
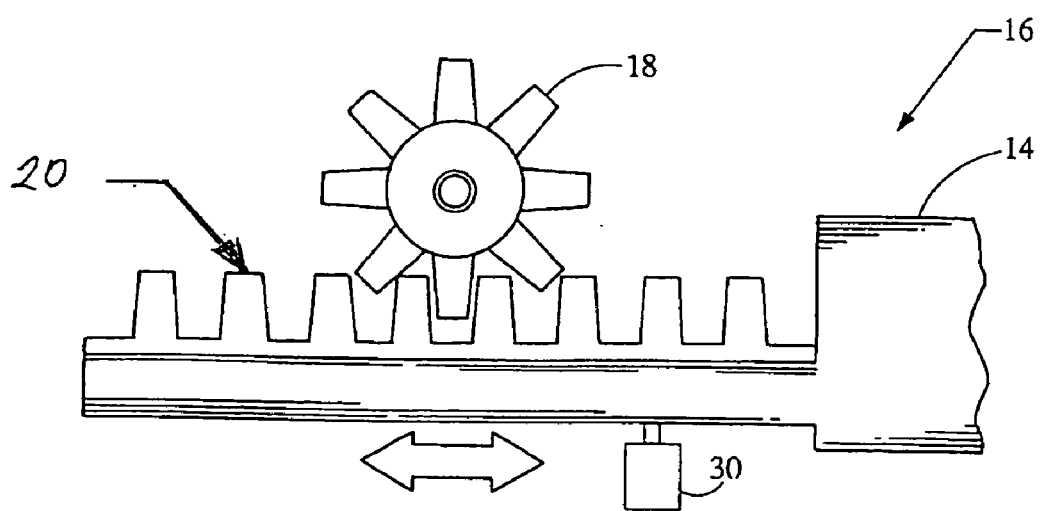
FIG. 2 is a simplified illustration of a mechanical actuator of the rack and pinion variety used to extend and retract the grill.

FIG. 2 illustrates one example of an actuator 16 capable of moving grill 14 between its retracted and extended positions as shown in FIG. 1. Pinion gear 18 is driven through an appropriate electrical or hydraulic motor and rotates causing toothed rack 20 to stroke in the linear direction as indicated by the arrows of FIG. 2. Toothed rack 20 is connected to grill 14. In a preferred implementation, two or more of actuators 16 would be used for controlling the position of grill 14.

Since a primary function of pedestrian protection apparatus 10 is to absorb impact energy with the pedestrian, actuators 16 may designed to provide energy absorption during impact. For example, the teeth of toothed rack 20 may be designed to shear in response to an impact load while the teeth of pinion gear 18 would maintain their integrity. Numerous other strategies for energy absorption could be implemented, including, using viscous or other energy absorbing mechanical damper associated with pinion gears 18, mounting the whole structure of actuator 16 to its own energy absorbing structure, or using an energy absorbing structure connected directly with toothed rack 20 that responds to provide dampening in the event that toothed rack 20 is accelerated.

Figure 3:
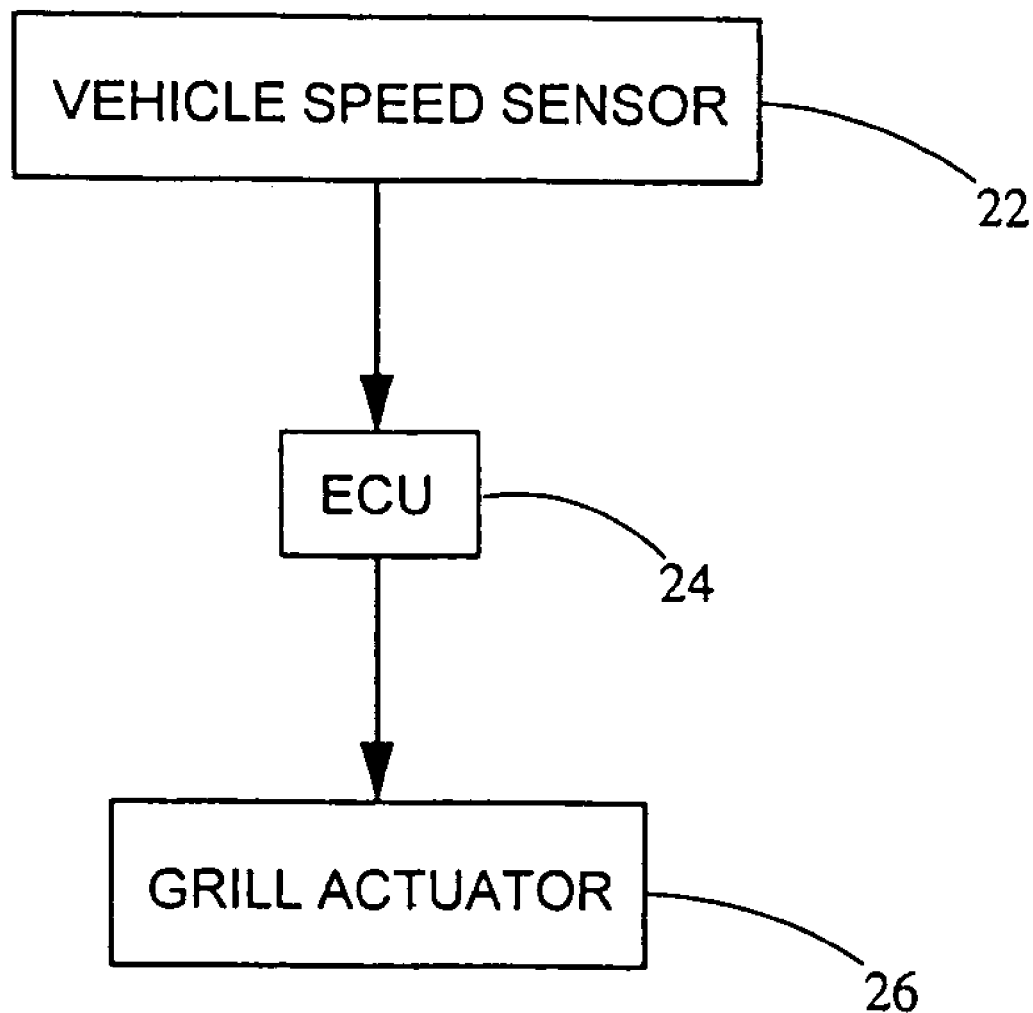
FIG. 3 is a schematic diagram of a control system for the pedestrian impact protection system in accordance with the present invention.

As an approach toward simplifying the control strategies for pedestrian protection apparatus 10, its deployment may be, in one example, controlled entirely in response to vehicle speed inputs. FIG. 3 illustrates diagrammatically a control system in which vehicle speed sensor 22 provides vehicle speed inputs to electronic control unit (ECU) 24. Vehicle speed sensor 22 would likely comprise the speed sensors present on modern motor vehicles used for controlling other functions of the vehicle including power train control systems, anti-lock brake systems (ABS), and vehicle stability control systems. ECU unit 24 provides inputs for grill actuator 26 which provides a driving control for pinion gear 18 of actuator 16. In each case, it is preferred that the system operate automatically without direct intervention by an occupant of the vehicle.

Various control strategies could be employed based on the output from vehicle speed sensor 22. The following Table 1 illustrates one such control approach.

TABLE 1

| Speed Signal | Actuator Position | Action |
| --- | --- | --- |
| #1 Speed > 10–35 mph | Retracted | Extend Actuator |
| | Extended | No Change |
| #2 Speed < 8 mph | Retracted | No Change |
| | Extended | Retract Actuator |
| #3 Speed > 37 mph | Retracted | No Change |
| | Extended | Retract Actuator |

In the table, a measured speed of greater than a first predetermined threshold (#1) of for example 10 to 35 mph with actuator 26 in the retracted position commands the actuator to move to its extended position. These speeds are associated with the threshold at which the system is capable of providing reductions in pedestrian impact injuries. In the event that the vehicle speed falls below a second predetermined threshold, i.e. about 8 mph (#2) and actuator 26 is in the extended position, the actuator is caused to retract grill 14. This would place grill 14 in the retracted position in the normal resting condition of the vehicle while it is parked or when it is moving at a very low rate of speed. When the speed signal indicates a speed above a third predetermined threshold, i.e. above about 37 mph (#3) and actuator 26 is in the extended position, it is caused to retract. This reflects the fact that minimal positive benefits are provided above this speed for an impacted pedestrian and retraction will serve to streamline the vehicle at higher vehicle speeds. Apparatus 10 may also be controlled using other signal inputs, such as impact detection systems or manual driver input to extend grill 14.

The extended position of grill 14 in the forward direction may be optimized for a particular vehicle design. In one preferred embodiment, grill 14 in the extended position will extend beyond the front edge of the vehicle bumper 28 and retract to a position behind the bumper. In other implementations, grill 14, while in the extended position will be at the forward position of bumper 28.

Pedestrian protection apparatus 10 is principally designed to deal with impact loads generated by a motor vehicle in the 1,500 pound to 6,000 pound range, traveling in the 8 mph to 35 mph range, and impacting a substantially stationary pedestrian in the 25 pound to 250 pound range. This is contrasted to loads generated by vehicle-to-vehicle collisions or by a vehicle impacting a stationary structure. Devices optimized for such vehicle-to-vehicle or single vehicle collisions with stationary objects would deform only an insignificant amount if exposed to the vehicle-to-pedestrian impact loads addressed by the present invention, thus providing little benefit for pedestrians.

Grill 14, when in the extended position, may also provide a signal when an impact occurs to trigger other injury reducing mechanisms such as hood lifting devices which are presently known. For example, sensor 30 may be coupled with actuator 16 to provide an output when it is accelerated rapidly in response to a pedestrian impact.

While the above description constitutes the preferred embodiment of the present invention, it will be appreciated that the invention is susceptible to modification, variation and change without departing from the proper scope and fair meaning of the accompanying claims.

The invention claimed is:

1. A pedestrian protection apparatus for a motor vehicle comprising:
   a grill affixed to a front end structure of the motor vehicle,
   an actuator coupled to the grill for moving the grill between a retracted position and an extended position, with the grill in the extended position providing impact protection for a pedestrian impacted by the motor vehicle through energy absorption through retraction of the grill against the actuator,
   a control unit for controlling the actuator based at least in part on the forward speed of the motor vehicle;
   wherein when the forward speed of the motor vehicle is greater than a first predetermined threshold, and the grill is in the extended position, the control unit causes the grill to move to the refracted position; and
   wherein when the forward speed of the motor vehicle is less than the first predetermined threshold and greater than a second predetermined threshold, and the grill is in the retracted position, the control unit causes the grill to move to the extended position.

2. The pedestrian protection apparatus according to claim 1 wherein the motor vehicle further includes a bumper located below the grill, the grill positioned forward of the bumper in the extended position and rearward of the bumper in the retracted position.

3. The pedestrian protection apparatus according to claim 1 wherein the actuator comprises a pinion gear driving a toothed rack with the toothed rack coupled with the grill.

4. The pedestrian protection apparatus according to claim 1 wherein the actuator has elements which mechanically fail to provide energy absorption upon the impacting of the motor vehicle with the pedestrian.

5. The pedestrian protection apparatus according to claim 1 wherein the actuator comprises at least two of the actuators provided for moving the grill.

6. The pedestrian protection apparatus according to claim 1 wherein the grill includes apertures for vehicle headlights.

7. The pedestrian protection apparatus according to claim 1 wherein the grill outside perimeter substantially encompasses the frontal surface of the front end structure of the motor vehicle.

8. The pedestrian protection apparatus according to claim 1 wherein the second predetermined threshold speed is about 8 to 10 mph and the first predetermined threshold speed is about 35 to 37 mph.

9. The pedestrian protection apparatus according to claim 1 further comprising an impact sensor coupled with the apparatus to detect an impact with the grill in the extended position.

10. The pedestrian protection apparatus according to claim 1 wherein the pedestrian protection apparatus provides energy absorption when the grill is in the extended position for a pedestrian in the 25 pound to 250 pound range, struck by the motor vehicle in the 1500 pound to 6000 pound range, at a speed of the motor vehicle between 8 mph and 35 mph.

11. The pedestrian protection apparatus according to claim 1 wherein the control unit operates automatically without intervention by an occupant of the motor vehicle.

12. A pedestrian protection apparatus for a motor vehicle comprising:
a grill affixed to a front end structure of the motor vehicle above a front bumper of the motor vehicle,
an actuator coupled to the grill for moving the grill between a retracted position and an extended position wherein the apparatus is configured to provide, when the grill is in the extended position, pedestrian energy absorption upon the impacting of the motor vehicle with the pedestrian, thereby reducing injury to the pedestrian through energy absorption through retraction of the grill against the actuator,
a control unit for controlling the actuator based at least in part on the forward speed of the motor vehicle; and
wherein the control unit responds to speed of the motor vehicle such that if the vehicle speed is above a first predetermined threshold and the grill is in the extended position, the control unit causes the grill to move to the refracted position.

13. The pedestrian protection apparatus according to claim 12 wherein the grill is positioned forward of the bumper in the extended position and rearward of the bumper in the retracted position.

14. The pedestrian protection apparatus according to claim 12 wherein the actuator comprises a pinion gear driving a toothed rack with the toothed rack coupled with the grill.

15. The pedestrian protection apparatus according to claim 12 wherein the actuator has elements which mechanically fail to provide energy absorption upon the impacting of the motor vehicle with the pedestrian.

16. The pedestrian protection apparatus according to claim 12 wherein the actuator comprises at least two of the actuators provided for moving the grill.

17. The pedestrian protection apparatus according to claim 12 wherein the grill includes apertures for vehicle headlights.

18. The pedestrian protection apparatus according to claim 12 wherein the grill outside perimeter substantially encompasses the frontal surface of the front end structure of the motor vehicle.

19. The pedestrian protection apparatus according to claim 12 wherein the control unit responds to speed of the motor vehicle such that if the vehicle speed is above a second predetermined threshold and the grill is in the retracted position, the control unit causes the grill to move to the extended position.

20. The pedestrian protection apparatus according to claim 19 wherein the second predetermined threshold is between 10 mph and 35 mph.

21. The pedestrian protection apparatus according to claim 12 wherein the control unit responds to speed of the motor vehicle such that if the vehicle speed is below a second predetermined threshold and the grill is in the extended position, the control unit causes the grill to move to the retracted position.

22. The pedestrian protection apparatus according to claim 21 wherein the second predetermined threshold is about 8 mph.

23. The pedestrian protection apparatus according to claim 12 wherein the first predetermined threshold is about 37 mph.

24. The pedestrian protection apparatus according to claim 12 further comprising an impact sensor coupled with the apparatus to detect an impact with the grill in the extended position.

25. The pedestrian protection apparatus according to claim 12 wherein the pedestrian protection apparatus provides energy absorption when the grill is in the extended position for a pedestrian in the 25 pound to 250 pound range, struck by the motor vehicle in the 1500 pound to 6000 pound range, at a speed of the motor vehicle between 8 mph and 35 mph.

26. The pedestrian protection apparatus according to claim 12 wherein the control unit operates automatically without intervention by an occupant of the motor vehicle.

* * * * *